(12) United States Patent
Li et al.

(10) Patent No.: US 9,183,293 B2
(45) Date of Patent: Nov. 10, 2015

(54) SYSTEMS AND METHODS FOR SCALABLE TOPIC DETECTION IN SOCIAL MEDIA

(75) Inventors: Lei Li, Miami, FL (US); Wei Peng, Fremont, CA (US); Tong Sun, Penfield, NY (US)

(73) Assignee: XEROX CORPOATION, Norwalk, CT (US)

( * ) Notice: Subject to any disclaimer, the term of this patent is extended or adjusted under 35 U.S.C. 154(b) by 182 days.

(21) Appl. No.: 13/324,391

(22) Filed: Dec. 13, 2011

(65) Prior Publication Data
US 2013/0151531 A1    Jun. 13, 2013

(51) Int. Cl.
*G06F 17/30* (2006.01)
*G06Q 30/02* (2012.01)
*G06Q 50/00* (2012.01)

(52) U.S. Cl.
CPC ...... *G06F 17/30734* (2013.01); *G06F 17/3071* (2013.01); *G06Q 30/02* (2013.01); *G06Q 50/01* (2013.01)

(58) Field of Classification Search
CPC ............. G06F 17/30705; G06F 17/30707; G06F 17/30734; G06F 17/3071; G06Q 50/01; G06Q 30/02
USPC ........................................................ 707/739
See application file for complete search history.

(56) References Cited

U.S. PATENT DOCUMENTS

| | | | |
|---|---|---|---|
| 6,253,169 B1 * | 6/2001 | Apte et al. | 704/9 |
| 7,139,754 B2 * | 11/2006 | Goutte et al. | 707/740 |
| 7,769,762 B2 * | 8/2010 | Lemcke et al. | 707/748 |
| 8,677,366 B2 * | 3/2014 | Agarwal et al. | 718/102 |
| 2008/0249999 A1 * | 10/2008 | Renders et al. | 707/4 |

OTHER PUBLICATIONS

Gabrilovich, E. and Markovitch, S. Computing Semantic Relatedness using Wikipedia-based Explicit Semantic Analysis, (2007) [retrieved on Nov. 1, 2012], pp. 1-6. Retrieved from the Internet: http://www.aaai.org/Papers/IJCAI/2007/IJCAI07-259.pdf.*

Schonhofen, P. Identifying document topics using the Wikipedia category network, (2009) [retrieved on Nov. 1, 2012], pp. 195-207. Retrieved from the Internet: http://dl.acm.org/citation.cfm?id=1249180.*

Hong, L. and Davison, B. Empirical Study of Topic Modeling in Twitter, (2010) [retrieved on Nov. 1, 2012], pp. 80-88. Retrieved from the Internet: http://dl.acm.org/citation.cfm?id=1964858.1964870.*

(Continued)

*Primary Examiner* — Boris Gorney
*Assistant Examiner* — Kristopher Andersen
(74) *Attorney, Agent, or Firm* — MH2 Technology Law Group LLP

(57) ABSTRACT

Embodiments generally relate to systems and methods for detecting topics in social media data. More particularly, the systems and methods can extract a concept hierarchy from a set of data, wherein the concept hierarchy comprises a plurality of layers. Further, the systems and methods can train topic models based on the content in each of the layers. Still further, the systems and methods can select the most appropriate topic model for social media data by balancing the complexity of the model and the accuracy of the topic detection result. Moreover, the systems and methods can use the most appropriate topic model to detect topics in social media data.

16 Claims, 5 Drawing Sheets

(56) References Cited

OTHER PUBLICATIONS

Irani, D., Webb, S., Pu, C., and Li, L. Study of Trend Stuffing on Twitter through Text Classification, (2010) [retrieved on Nov. 1, 2012], pp. 1-10. Retrieved from the Internet: http://ceas.cc/2010/papers/Paper%2013.pdf.*

Weale, T. Utilizing Wikipedia Categories for Document Classification, (2008) [retrieved on Nov. 1, 2012], pp. 1-4. Retrieved from the Internet: ftp://www.cse.ohio-state.edu/pub/tech-report/2008/TR14.pdf.*

Benhardus, "Streaming Trend Detection in Twitter", 2010 UCCS REU for Artificial Intelligence. Natural Language Processing and Information Retrieval Final Report, pp, 1-7.

Blei et al., "Latent Dirichlet Allocation", Journal of Machine Learning Research 3 (2003), pp. 993-1022.

Cataldi et al., "Emerging Topic Detection on Twitter based on Temporal and Social Terms Evaluation", (10 pages), 2010.

Dean et al., "MapReduce: Simplified Data Processing on Large Clusters", USENIX Association, OSDI '04: 6th Symposium on Operating Systems Design and implementation, pp, 137-149, 2004.

Gionis et al., "Similarity Search in High Dimensions via Hashing", Proceedings of the 25th VLDB Conference, Edinburgh, Scotland, 1999, pp. 518-529.

Hofmann, "Probabilistic Latent Semantic Analysis", Uncertainty in Artificial Intelligence, UAI '99, Stockholm, (8 pages), 1999.

Indyk, "A Small Approximately Min-Wise Independent Family of Hash Functions", Journal of Algorithms 38, 2001, pp. 84-90.

Mathioudakis et al., "TwitterMonitor: Trend Detection Over the Twitter Stream", (3 pages), 2010.

Meyer et al., "Towards Using Wikipedia as a Substitute Corpus for Topic Detection and Metadata Generation in E-Learning", (8 pages), 2006.

Michelson et al., "Discovering Users' Topics of Interest on Twitter: A First Look", AND '10, Oct. 26, 2010, Toronto, Ontario, Canada, (7 pages).

Petrovic et al., "Streaming First Story Detection with Application to Twitter", Human Language Technologies: The 2010 Annual Conference of the North American Chapter of the ACL, pp. 181-189, Los Angeles, CA, Jun. 2010, © 2010 Association for Computational Linguistics.

Weng et al., "TwitterRank: Finding Topc-sensitive Influential Twitters", WSDM '10, Feb. 4-6, 2010, New York City, NY, USA, pp. 261-270.

* cited by examiner

SYSTEMS AND METHODS FOR SCALABLE TOPIC DETECTION IN SOCIAL MEDIA

BACKGROUND OF THE INVENTION

Social media is becoming increasingly prevalent with the advent of new technologies, advances in communication channels, and other factors. Social media platforms and websites, such as FACEBOOK® social networking service, TWITTER® social networking service, and others, attract users to post and share messages for a variety of purposes, including daily conversation, sharing uniform resource locators (URLs) and other data, among other uses. Companies, individuals, and other entities may desire to detect topics described in social media data, for the purpose of discovering "trending topics," tracking online users interests, understanding users' complaints or mentions about a product or service, or other purposes. For example when a company launches a marketing campaign for a newly-released product, the company may desire to investigate whether the product or service is relevant to the trending topics recently discussed on social media, or whether the product or service might be desired by selected users.

Existing topic detection methodologies are generally based on probabilistic language models, such as Probabilistic Latent Semantic Analysis (PLSA) and Latent Dirichlet Allocation (LDA). However, these analyses assume that a single document contains rich information, which is not applicable to some forms of social media. For example, a "tweet" from the TWITTER® social networking service is limited to 140 characters. In addition, the detected topics by probabilistic methods are difficult to interpret in a human-understandable way, in part because the methods can only identify a set of "key" terms associated with a set of numerical values to indicate how important the terms are for each detected topic. An additional concern of topic detection in social media is the issue of scalability. More particularly, a large volume of tweets and other data postings are posted on various social networking websites and platforms every day in an order of hundreds of millions.

Therefore, it may be desirable to have systems and methods for detecting topics in social media. In particular, it may be desirable to have systems and methods for leveraging available data to construct topic models and interpret generated results in a human-understandable way.

SUMMARY

An embodiment generally relates to method of processing data. The method comprises processing a data set to extract a hierarchy of topics comprising a plurality of layers and linking a portion of the data set to an appropriate topic of the hierarchy of topics. Further, for each layer of the plurality of layers, the method comprises employing a classification technique to train a topic model based on a subset of the portion of the data set that is residing in the layer. Still further, the method comprises evaluating an accuracy of each topic model of the topic models and examining the accuracy of each topic model of the topic models to identify a layer of the plurality of layers corresponding to a topic model that is most appropriate for social media data.

Another embodiment pertains generally to a system for processing data. The system comprises an interface to a storage device configured to store a data set and a processor that communicates with the storage device via the interface. The processor is configured to process the data set to extract a hierarchy of topics comprising a plurality of layers, and link a portion of the data set to an appropriate topic of the hierarchy of topics. Further, for each layer of the plurality of layers, the processor is configured to employ a classification technique to train a topic model based on a subset of the portion of the data set that is residing in the layer. Still further, the processor is configured to evaluate an accuracy of each topic model of the topic models and examine the accuracy of each topic model of the topic models to identify a layer of the plurality of layers corresponding to a topic model that is most appropriate for social media data.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
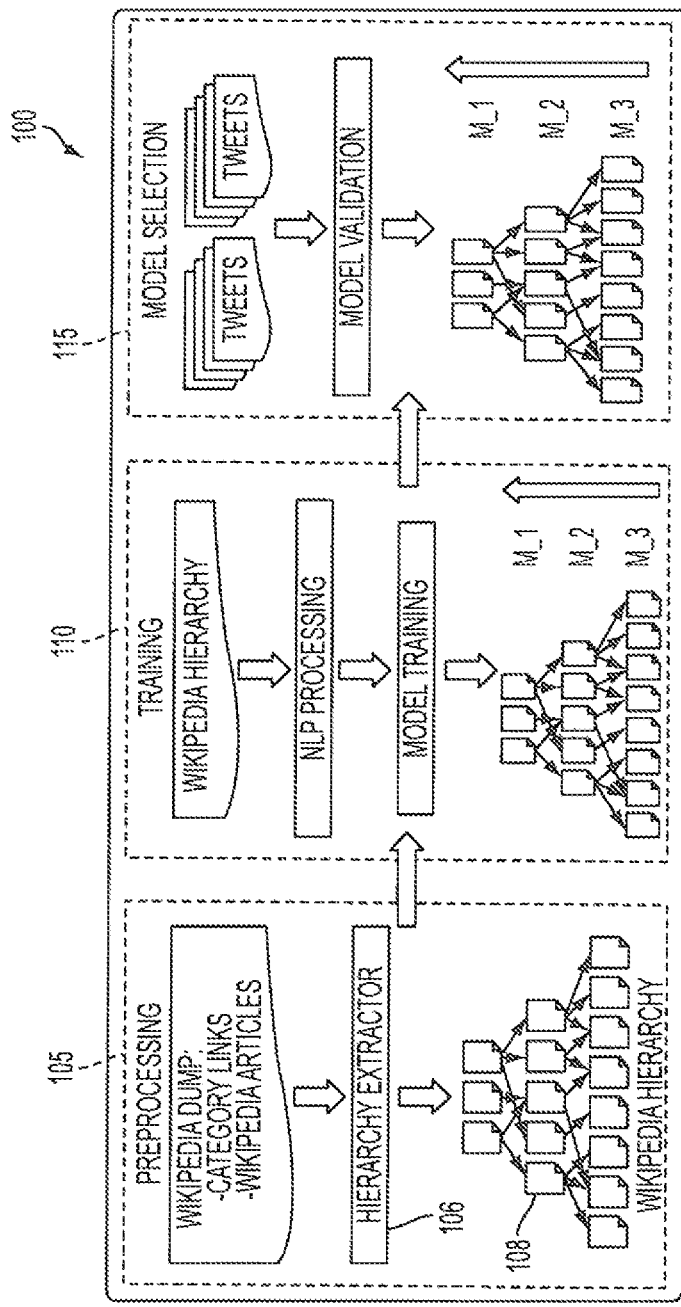
FIG. 1 illustrates an exemplary overall framework, according to various embodiments.

For simplicity and illustrative purposes, the principles of the present teachings are described by referring mainly to exemplary embodiments thereof. However, one of ordinary skill in the art would readily recognize that the same principles are equally applicable to, and can be implemented in, all types of analysis systems, and that any such variations do not depart from the true spirit and scope of the present invention. Moreover, in the following detailed description, references are made to the accompanying figures, which illustrate specific embodiments. Electrical, mechanical, logical and structural Changes can be made to the embodiments without departing from the spirit and scope of the present invention. The following detailed description is, therefore, not to be taken in a limiting sense and the scope of the present invention is defined by the appended claims and their equivalents.

Embodiments generally relate to systems and methods for detecting topics in social media data. In particular, the systems and methods are configured to extract a concept hierarchy from a set of data, the concept hierarchy comprising a plurality of layers. Further, the systems and methods can train topic models based on the content in each of the layers. Still further, the systems and methods can select the most appropriate topic model for social media topic detection by balancing the complexity of the model and the accuracy of the topic detection result. Moreover, the systems and methods can use the most appropriate topic model to detect topics in social media data.

Topic detection in social media can be beneficial in various fields and environments. For example, in business environments, when a company releases a new product or service, customers or potential customers might post or comment on the product or service in a social media environment. Therefore, it would be beneficial for the company to obtain instant access to what is being said about the product, service, or the brand to get a stream of ideas, content, links, resources, and/or tips focused on the new product or service, and to monitor what is being said about the customers or target audience.

To achieve this, the present embodiments are configured to detect topics in social media, by, for example, discovering trending topics or tracking interests of users. Despite the advent of new technologies, topic detection in social media is not trivial for at least three reasons. First, the special characteristics of social media data such as, for example, brevity, vulnerability to noise, and others, render detecting potential topics in social media data much more challenging. Second, the volume of social media data requires more research for efficient implementation of topic detection algorithms and real-time processing. Third, the generated results or topics from most existing topic detection algorithms cannot be easily interpreted.

According to the present embodiments, processing components of the systems and methods can perform topic detection on social media data related to a specific trend or a specific user by concatenating the content of the social media data and preprocessing the social media data using well-known natural language processing techniques. Further, the processing components can employ scalable machine learning techniques, associated with a map-reduce programming framework for topic modeling, and then adopt a locality-sensitive hashing technique to expedite the topic detection procedure. Still further, the processing components can utilize available data, such as data from WIKIPEDIA® Internet encyclopedia, for topic modeling and detection. The detected topics can be interpreted by human ontology.

It should be appreciated that, although the systems and methods as described herein incorporate the use of WIKIPEDIA® Internet encyclopedia, using other available encyclopedia or reference data is envisioned, either singularly or in combination with WIKIPEDIA® Internet encyclopedia. Further, although the systems and methods as described herein incorporate the use of TWITTER® social networking service and data thereof, using other available social media data and platforms is envisioned, either singularly or in combination with TWITTER® social networking service. As used herein, a "tweet" can be any data (e.g., comments, links, etc.) posted by a TWITTER® social networking service user via the TWITTER® social networking service platform or associated applications or plug ins.

The use of WIKIPEDIA® Internet encyclopedia is beneficial because WIKIPEDIA® Internet encyclopedia offers a comparatively complete, freely accessible, and structured collection of world knowledge and content. Further, WIKIPEDIA® Internet encyclopedia contains abundant conceptual and semantic information that can be utilized to model the topics in a variety of sets of documents. In the embodiments as described herein, WIKIPEDIA® Internet encyclopedia articles in combination with TWITTER® social network service data can be used as a substitute corpus to train topic models. In particular, articles of the WIKIPEDIA® Internet encyclopedia and tweets on TWITTER® social networking service bear a resemblance, which can be quantitatively measured. Further, whenever a tweet is statistically similar to a particular WIKIPEDIA® Internet encyclopedia article, there can also be a similarity in the corresponding topics. Moreover, the hierarchical structure of WIKIPEDIA® Internet encyclopedia in combination with the abundant conceptual information can allow a thorough interpretation of the detected topics.

Referring to FIG. 1, depicted is a framework 100 of the systems and methods as described herein. More particularly, the framework 100 comprises a preprocessing stage 105, a training stage 110, and a model selection stage 115. According to embodiments, in the preprocessing stage 105, a WIKIPEDIA® Internet encyclopedia concept hierarchy 108 can be extracted 106 from WIKIPEDIA® Internet encyclopedia dump files 107. In particular, the WIKIPEDIA® Internet encyclopedia dump files 107 can comprise a category link dump and a WIKIPEDIA® Internet encyclopedia articles dump. The category link dump can comprise files containing human-specified concept relations, i.e., the is-a relations, whereas the WIKIPEDIA® Internet encyclopedia articles dump can comprise files that store information comprising article content, redirect links, and/or the like. Further, the WIKIPEDIA® Internet encyclopedia articles can be linked onto the hierarchy 108 to enrich the content of the hierarchy 108. Because the records in the dump files are in the order of tens of millions, a Map-Reduce programming framework can be employed to handle the dump files in parallel and to expedite the procedure of hierarchy extraction.

The systems and methods as described herein can rely on the WIKIPEDIA® Internet, encyclopedia conceptual hierarchy for topic modeling and, therefore, constructing the WIKIPEDIA® Internet encyclopedia hierarchy is helpful. According to embodiments, the WIKIPEDIA® Internet encyclopedia hierarchy can be stored according to various conventions. Referring to Table 1, an exemplary storing convention for the WIKIPEDIA® Internet encyclopedia hierarchy is illustrated:

TABLE 1

| Concept ID | Concept Title | Parent IDs | Children IDs | Level |
| --- | --- | --- | --- | --- |
| 691182 | Science | | 1162606, 700292, 772270, 4076421 | 0 |
| ... | | | | |
| 4892515 | Arts | | 752, 1212, 1480241, 29560452 | 0 |
| ... | | | | |
| ... | ... | ... | ... | ... |

Referring to Table 1, the "Concept ID" column and the "Concept Title" column can identify the associated concept in the WIKIPEDIA® Internet encyclopedia hierarchy. Further, the "Parent IDs" and the "Children IDs" can illustrate any correlations between the associated concept and other related concepts, and the "Level" specifies the layer in which the associated concept is lying. It should be appreciated that a concept may belong to different layers, since the concept may be relevant to concepts within different levels. As a result, the table can record many possible levels for concepts.

Figure 2:
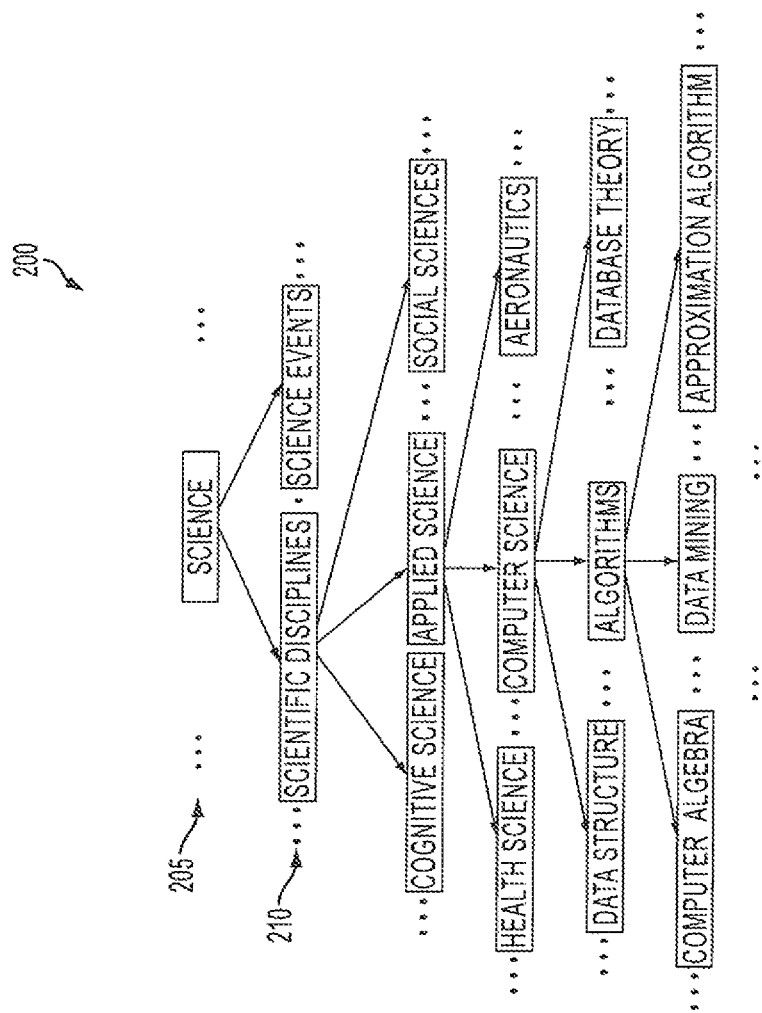
FIG. 2 illustrates an exemplary hierarchy of a set of data, according to various embodiments.

Because of the large volume of WIKIPEDIA® Internet encyclopedia concept and article information, the present embodiments can adopt the APACHE™ HADOOP® distributed file system project, or similar techniques, for distributed processing of dump files across clusters of computing resources using, for example, the MapReduce programming framework available from GOOGLE® company. More particularly, in MapReduce processing, a user can select a number of concepts as a top level of an exemplary hierarchy. For example, a user can select eight (8) general concepts (e.g., Arts, Science, Technology, History, etc.) as the top level of the hierarchy. The MapReduce framework can attempt to find the "children" of each of the concepts in a WIKIPEDIA® Internet encyclopedia hierarchy, and then put the children into a "mapper collector." In addition, the mapper collector can identify and record the parents and the level of each of the concepts by, for example, labeling from "0" for the top level. The MapReduce framework can then combine each concept's parents and children, and associate the articles in the WIKIPEDIA® Internet encyclopedia article dump with the concept. As a result, the WIKIPEDIA® Internet encyclopedia hierarchy can be efficiently extracted from dump files. Further, the extracted WIKIPEDIA® Internet encyclopedia hierarchy contains not only the concepts in each level, but also the articles related to each concept. For example, FIG. 2 illustrates an exemplary WIKIPEDIA® Internet encyclopedia hierarchy 200. As shorn in FIG. 2, the "level 0" concept 205 is "Science," the "level 1" concepts 210 are "Scientific disciplines" and "Science Events," and so on.

Referring back to the training step 110 of FIG. 1, the systems and methods as described herein can, for each layer of the WIKIPEDIA® Internet encyclopedia hierarchy that is identified and/or processed, train a topic model based on the articles associated with their corresponding topical categories and residing in the associated layer. Further, to improve the quality of topic models, the systems and methods can perform some preprocessing on the articles by removing stop words, tokenizing, stemming, and/or performing other functions, in addition, the systems and methods can calculate information retrieval measurements, such as term frequency-inverse document frequency and information gain, to attempt to capture "important" terms from each article. In this way, the WIKIPEDIA® Internet encyclopedia articles can be represented as various "important" words for further topic modeling.

To train the topic models, the systems and methods can employ the "Naive Bayes classifier," which is a probabilistic learning technique. Specifically, the probability of an article (d) being in a topic class (c) can be computed as equation (1):

$$P(c|d) \propto P(c) \cdot \pi_{1 \leq k \leq n} P(t_k|c) \quad (1)$$

In equation (1), $P(t_k|c)$ is the conditional probability of term $t_k$ occurring in an article of class c. More particularly, $P(t_k|c)$ can be interpreted as a measure of how much evidence $t_k$ contributes that c is the correct class. P(c) is the prior knowledge of a document occurring in class c. Further, if the terms in a document do not provide clear evidence for one class versus another, the term that has a higher prior probability can be selected. $<t_1, t_2, \ldots, t_n>$ are the terms in an article d that are part of the vocabulary that is used for classification, and $n_d$ is the number of such terms in d.

Further, the "best" class in the Naive Bayes classification is the most likely or maximum a posteriori (MAP) class, $C_{MAP}$, which can be defined according to equation (2):

$$C_{MAP} = \text{argmax}_{c \in C} \hat{P}(c|d) = \text{argmax} \cdot \hat{P}(c) \cdot \pi_{1 \leq k \leq n} \hat{P}(t_k|c) \quad (2)$$

Because the true values of P(c) and $\pi_{1 \leq k \leq n} P(t_k|c)$ cannot be directly obtained, equation (2) instead incorporates $\hat{P}(c)$ and $\pi_{1 \leq k \leq n} \hat{P}(t_k|c)$, both of which are estimated from the training set (e.g., the WIKIPEDIA® Internet encyclopedia articles). Specifically, to estimate these two parameters, the systems and methods can use maximum likelihood estimation (MLE), which is the relative frequency and corresponds to the most likely value of each parameter given the training data. The prior knowledge(s) $\hat{P}(c)$ are estimated using $$\hat{P}(c) = \frac{N_c}{N},$$

where $N_c$ is the number of articles in category c and N is the total number of articles in a specific WIKIPEDIA® Internet encyclopedia level. The conditional probability $\hat{P}(t|c)$ can be estimated as a relative frequency of term t in articles belonging to class c, as detailed in equation (3):

$$\hat{P}(t|c) = \frac{T_{ct}}{\sum_{t' \in V} T_{ct'}} \quad (3)$$

In equation (3), $T_{ct}$ is the number of occurrences of t in training articles from class c, including multiple occurrences of a term in an article. In some cases, the training data may not be large enough to represent the frequency of rare events due to the sparseness of terms. To accommodate such sparseness, the systems and methods can use "Laplacian smoothing" to estimate $\hat{P}(t|c)$, which adds a "Dirichlet Prior" related to the term "t" to each count, as detailed in equation (4):

$$\hat{P}(t|c) = \frac{T_{ct} + D(t)}{\sum_{t' \in V} (T_{ct'} + D(t'))} \quad (4)$$

Further, a simple version of Laplacian smoothing is to add a uniform prior to each count, as detailed in equation (5):

$$\hat{P}(t|c) = \frac{T_{ct} + 1}{\sum_{t' \in V} (T_{ct'} + 1)} = \frac{T_{ct} + 1}{\sum_{t' \in V} T_{ct'} + |V|} \quad (5)$$

More particularly, |V| is the number of terms in the vocabulary V. By using Laplace Smoothing, the systems and methods can obtain more accurate estimation of the parameters.

Referring back to the model selection stage 115 of FIG. 1, the systems and methods as described herein can be configured to select an appropriate topic model for topic detection by balancing the complexity of the model and the accuracy of the topic detection result. Further, the systems and methods can attempt to validate topic models on level-by-level basis. More particularly, given a validation set of tweets with human labels, the systems and methods can evaluate the accuracy of the trained topic model in each level, and then select the level whose accuracy is not significantly dropped compared with higher levels, levels with more categories, and the like.

The systems and methods can extract ten (10) levels, or other amounts, of WIKIPEDIA® Internet encyclopedia hierarchy. In the case of any computation resource limitations, the systems and methods can train topic models on a subset of WIKIPEDIA® Internet encyclopedia articles. More particularly, to select the best layer for topic modeling, the systems and methods can use a small set of tweets, with about 50 trends, or other amounts of trends, to validate the model in each level of the WIKIPEDIA® Internet encyclopedia hierarchy. Referring to Table 2, shown are statistics related to an exemplary validation dataset.

TABLE 2

| Trends | Tweets |
| --- | --- |
| Japan | 35,415 |
| Egypt | 10,920 |
| Libya | 8,658 |
| Android | 6,704 |
| Yelp | 4,699 |
| NBA | 4,071 |
| ... | ... |

Figure 3:
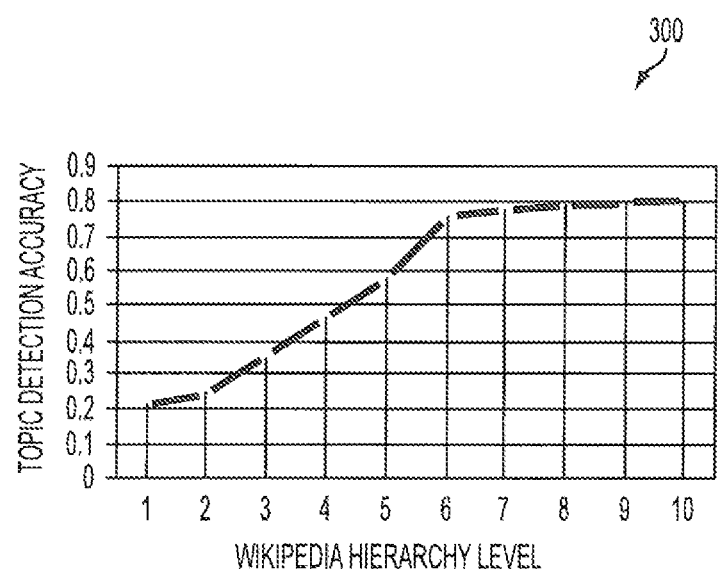
FIG. 3 is a chart depicting results of a model validation, according to various embodiments.

As shown in Table 2, for each "trend," there exists a certain amount of tweets that were posted by users using the TWITTER® social networking service platform. According to embodiments, for each layer of the hierarchy, human labels of tweets are assigned using the concepts of the layer, and the systems and methods can detect topics using the techniques as described herein, in embodiments, the systems and methods can report the accuracy of the result for each layer. Referring to FIG. 3, depicted is a chart 300 depicting a model validation result. As depicted in FIG. 3, the accuracy of the lower hierarchy levels is comparatively poor because, for example, more general topics may contain more overlapping words. In contrast, as depicted in FIG. 3, the accuracy of the higher levels is better. However, some models may be more complex if too many topics are involved, which can potentially lead to overfitting and large computation costs. To balance the complexity and accuracy, a median hierarchy level can be chosen, such as level 6 as depicted in FIG. 3.

Once the model level is selected, a topic detection technique can be applied according to the selected model level to detect topics in social media data. Further, to handle a large-scale topic detection, the systems and methods can use locality-sensitive hashing (LSH) to reduce any comparisons that reside in the procedure f model fitting. More particularly, the systems and methods can hash WIKIPEDIA® Internet encyclopedia articles in a median hierarchy level, such as level 6 in FIG. 3, into different buckets using LSH, When a group of new tweets is received or identified the systems and methods can hash the group of new tweets into a "bucket" to determine whether there are similar articles in the bucket. If there exist similar articles in the bucket, the systems and methods can run models that fit these similar articles on the testing tweets. As a result, the comparison can be reduced. It should be appreciated that the social media data to be analyzed can be a collection of TWITTER® social networking service data over any time range. For example, TWITTER® social networking service data can be collected over a range of seven (7) to fifteen (15) days, or other ranges.

To find similar WIKIPEDIA® Internet encyclopedia articles, the systems and methods can use a standard Jaccard index-based hashing procedure. More particularly, the procedure can first decompose WIKIPEDIA® Internet encyclopedia articles into "shingles" that can represent articles, to overcome disadvantages of the traditional bag-of-words model. Specifically, a k-shingle for an article is a sequence of k continuous words that appear in the article. Before decomposing the articles into the shingles, the systems and methods can execute a sequence of preprocessing steps, such as removing stop words, tokenizing, and stemming, on the original articles. Because typical WIKIPEDIA® Internet encyclopedia articles are in moderate length, the systems and methods can choose k=10 to reduce the probability of any given shingle appearing in any article. By shingling, the systems and methods can quantify the original WIKIPEDIA® Internet encyclopedia corpus as a shingle-article matrix M, where rows represent shingles and columns represent articles.

In general, the shingle-article matrix M may not fit into some memory, as the number of articles tends to be substantial. To alleviate this issue, the systems and methods can use a "Minhashing" technique to generate a succinct signature for each column in M, such that the probability of two articles having the same signature is equal to the Jaccard index similarity between the two articles. More particularly, the systems and methods can construct a Minhash signature of length-100, or other amounts, using one or more known techniques. In some cases, the randomized nature of the Minhash generation method can require further checks to increase the probability of uncovering all pairs of related articles in terms of the signature. Thus, the systems and methods utilize LSH to increase such probability.

More particularly, the systems and methods can employ LSH to reduce the comparisons, where the generated Minhash signatures can be initially decomposed into multiple bands. Further, for each band of the multiple bands, the systems and methods can adopt a standard hash function to hash the bands into a larger hash table. The columns whose bands are hashed into the same bucket at least once can be treated as the similar ones. Further, the original WIKIPEDIA® Internet encyclopedia corpus can be separated into multiple small articles groups.

In embodiments, when a group of new tweets is identified or received, the systems and methods can concatenate the group of new tweets into a single document and perform the same preprocessing on the single document. The single document can then be hashed using LSH to check whether there are similar WIKIPEDIA® Internet encyclopedia articles. If there are similar WIKIPEDIA® Internet encyclopedia articles, the systems and methods can choose, as the label of the tweets, the topic label of the article which is the most similar to the tweets. Otherwise, the systems and methods can run the topic model against the tweets to obtain the topic label.

Figure 4:
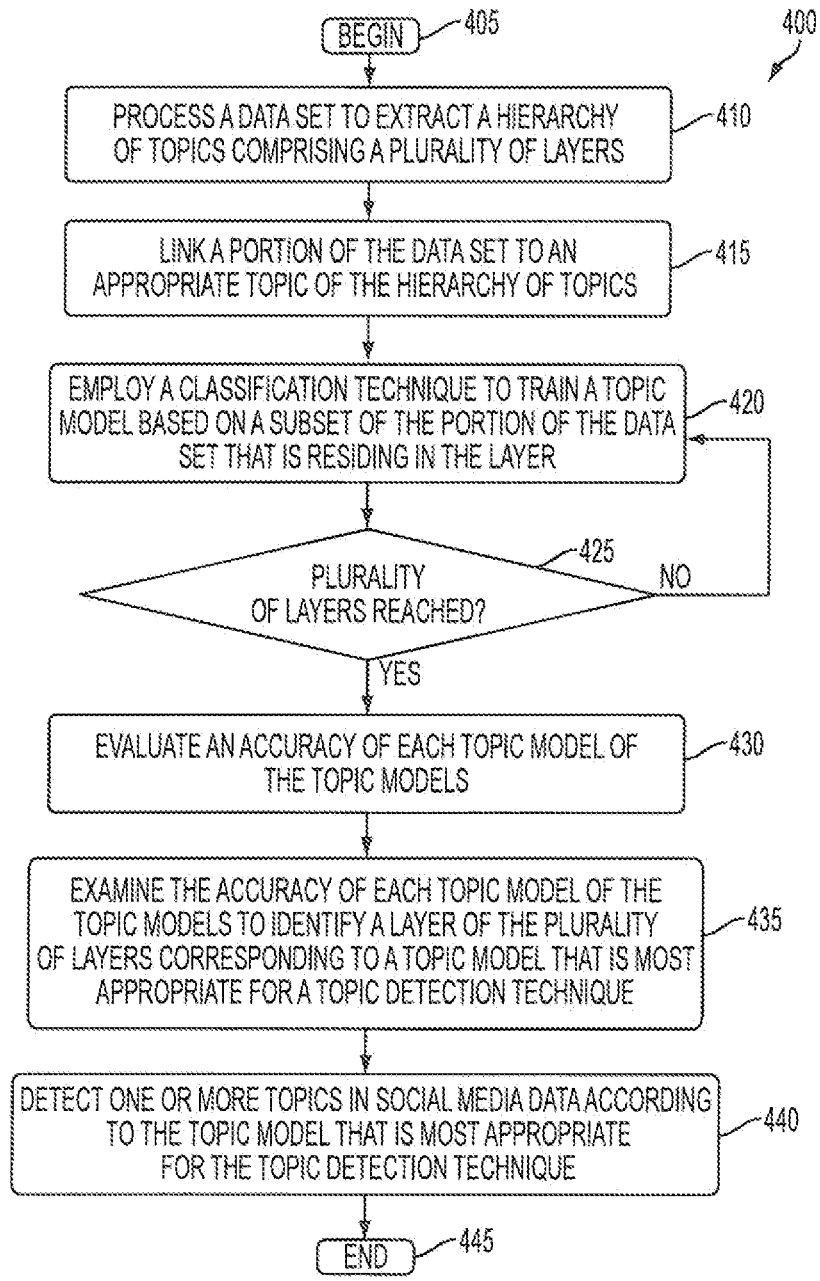
FIG. 4 illustrates an exemplary flow diagram implemented according to various embodiments.

FIG. 4 illustrates an exemplary flow diagram 400 that can be used in systems and methods for detecting topics in social media data. The steps of the flow diagram 400 can be performed by any type of processing module or application. It should be readily apparent to those of ordinary skill in the art that the flow diagram 400 depicted in FIG. 4 represents a generalized illustration and that other steps can be added or existing steps can be removed or modified.

As shown in FIG. 4, in 405, the process can begin. In 410, the processing module can process a data set to extract a hierarchy of topics comprising a plurality of layers. In embodiments, the data set can comprise a category link dump and an articles link dump from WIKIPEDIA® Internet encyclopedia. In 415, the processing module can link a portion of the data set to an appropriate topic of the hierarchy of topics. For example, the categories in the data set can be linked to the appropriate topic.

In 420, the processing module can employ a classification technique to train a topic model based on a subset of the portion of the data set that is residing in the layer. More particularly, a Naive Bayes classification method can be used to train the topic model based on the articles residing in the particular layer and associated with its corresponding categories. In 425, the processing module can determine if a topic model has been determined for each layer of the plurality of layers. If a topic model has not been determined for each layer (NO), the processing module can repeat 420. In contrast, if a topic model has been determined for each layer (YES, 430), then the processing module can evaluate an accuracy of each topic model of the topic model.

In 435, the processing module can examine the accuracy of each topic model of the topic models to identify a layer of the plurality of layers corresponding to a topic model that is most appropriate for a topic detection technique. For example, the most appropriate topic model identification can be based on the accuracy and complexity of the topic models. In 440, the processing module can detect one or more topics in social media data according to the topic model that is most appropriate for the topic detection technique. In embodiments, the social media data can be data collected from TWITTER® social networking service over a period of time such as, for example, seven (7) to fifteen (15) days. In 445, the processing can end, repeat, or return to any previous step.

Figure 5:
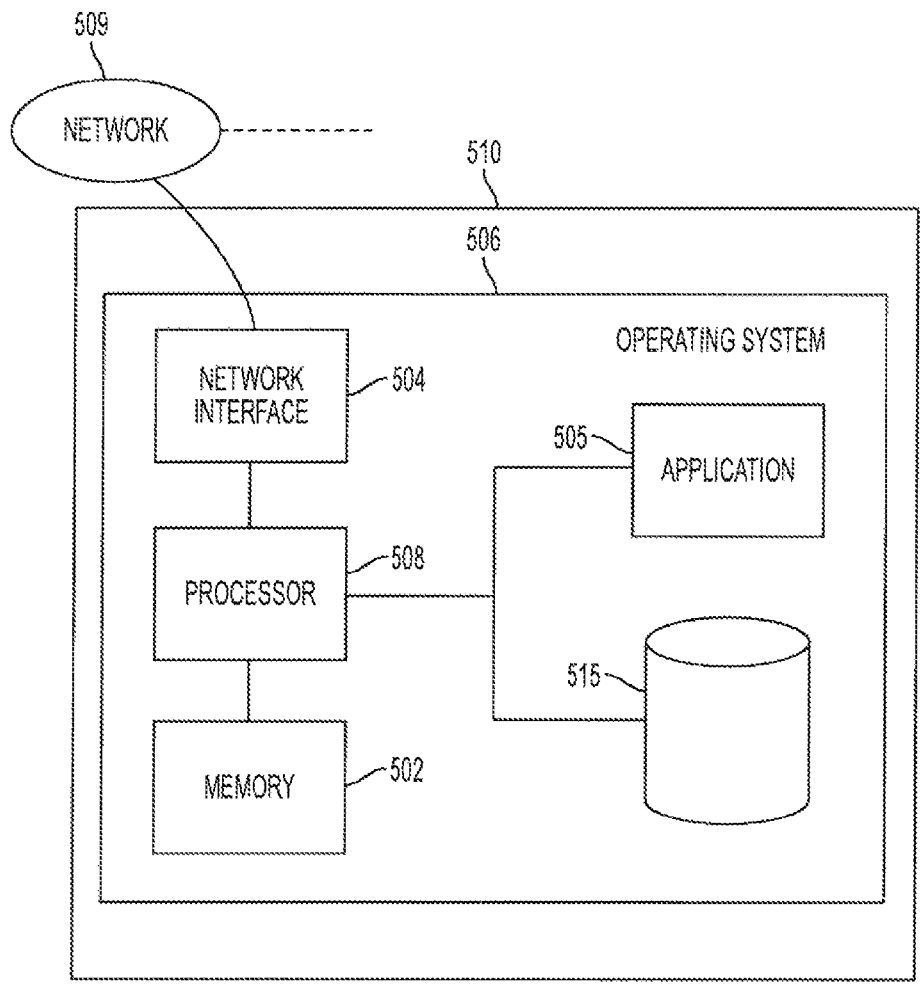
FIG. 5 illustrates a hardware diagram in accordance with another embodiment.

FIG. 5 illustrates an exemplary diagram of hardware and other resources that can be incorporated with processing and logic associated with the present embodiments. As shown in FIG. 5, a server 510 can be configured to communicate with a network 509. In embodiments as shown, the server 510 can comprise a processor 508 communicating with memory 502, such as electronic random access memory, or other forms of transitory or non-transitory computer readable storage mediums, operating under control of or in conjunction with an operating system 506. The operating system 506 can be any commercial, open-source, or proprietary operating system or platform. The processor 508 can communicate with a database 515, such as a database stored on a local hard drive.

While illustrated as a local database in the server 510, the database 515 can be separate from the server 510.

The processor 508 can further communicate with a network interface 504, such as an Ethernet or wireless data connection, which in turn communicates with the network 509, such as the Internet or other public or private networks. The processor 508 can also communicate with the database 515 or any applications 505, such as a topic detection application or other logic, to execute control logic and perform the data processing and/or topic detection functionality as described herein.

While FIG. 5 illustrates the server 510 as a standalone system comprising a combination of hardware and software, the server 510 can also be implemented as a software application or program capable of being executed by a conventional computer platform. For example, it should be understood that the components of the server 510 can be implemented on user PCs or other hardware such that the user PCs can communicate directly with the database 515. Likewise, the server 510 can also be implemented as a software module or program module capable of being incorporated in other software applications and programs. In either case, the server 510 can be implemented in any type of conventional proprietary or open-source computer language.

Certain embodiments can be performed as a computer program. The computer program can exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), RQM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of processing data, the method comprising:
   receiving identification of a plurality of concepts via a user interface, the concepts representing a top level of a hierarchy of topics;
   processing a data set to extract children of the top level of the hierarchy of topics, wherein at least the children of the hierarchy of topics is based on a hierarchy of the data set identified from a source of the data set;
   linking a portion of the data set to a subset of the hierarchy of topics, wherein the subset of the hierarchy of topics comprises one or more subtopics;
   extracting selected terms from the portion of the data set, wherein the selected terms were identified as important based on calculated information retrieval measurements of the portion of the data set;
   training topic models for the subset of the hierarchy of topics and the one or more subtopics using the selected terms from the portion of the data set and a probabilistic learning technique, wherein for each topic model the training comprises:
      determining a prior knowledge estimate based on estimated prior knowledge of a portion of the data set belonging to the topic model;
      determining a plurality of term contribution estimates by processing each term of the selected terms to estimate a measure of evidence that the term contributes to the portion of the data set belonging to the topic model; and
      combining the prior knowledge estimate and the plurality of term contribution estimates to determine a probability that the portion of the data set belongs to the topic model;
   evaluating an accuracy and evaluating a complexity of each topic model of the topic models in response to a determination that a topic model has been trained for at least one subtopic;
   determining, using one or more processors, that the subset of the hierarchy of topics is an appropriate topic for textual data generated via a social networking service by determining that the subset of the hierarchy of topics balances the accuracy and the complexity of the topic models, wherein the subset of the hierarchy of topics is at a median hierarchy level relative to the hierarchy of topics; and
   detecting one or more appropriate subtopics of the appropriate topic that are most appropriate for the textual data generated via the social networking service by examining the accuracy of each topic model associated with the one or more subtopics of the appropriate topic, wherein the detecting one or more appropriate subtopics of the appropriate topic comprises applying a locality-sensitive hashing (LSH) technique to the textual data generated via the social networking service and the portion of the data set.

2. The method of claim 1, wherein evaluating the accuracy of each topic model of the topic models comprises:
   identifying a label from the textual data generated via the social networking service according to the portion of data set;
   assigning the label to the appropriate topic;
   performing a topic detection technique; and
   comparing a result of the topic detection technique to but an references in order to determine the accuracy of each topic model of the topic models.

3. The method of claim 1, wherein the probabilistic learning technique is employed by using a model $P(c|d) \propto P(c) \cdot \pi_{1 \leq k \leq n} P(t_k|c)$ wherein $P(t_k|c)$ is a conditional probability of a term $t_k$ occurring in a subset of the portion of the data set having class c.

4. The method of claim 1, wherein the data set comprises a category link dump and an articles dump from an Internet encyclopedia.

5. The method of claim wherein the textual data generated via a social networking service is gathered over a period in a range of seven (7) to fifteen (15) days.

6. The method of claim 1, wherein the textual data generated via a social networking service is gathered from TWITTER® social networking service.

7. The method of claim 4, wherein the category link dump comprises human-specified concept relations and the articles dump comprises article content and redirect links.

8. The method of claim 1, wherein detecting the one or more appropriate subtopics that are most appropriate for the textual data generated via the social networking service comprises: receiving the textual data from a social networking service; concatenating the textual data into a single document; and detecting the one or more appropriate subtopics in the single document.

9. A system for processing data, comprising:

a storage device configured to store a data set; and a processor, communicating with the storage device, the processor being configured to perform actions comprising:

receiving identification of a plurality of concepts via a user interface, the concepts representing a top level of a hierarch of topics;

processing the data set to extract children of the hierarchy of topics, wherein at least the children of the hierarchy of topics is based on a hierarchy of the data set identified from a source of the data set;

linking a portion of the data set to a subset of the hierarchy of topics, wherein the subset of the hierarchy of topics comprises one or more subtopics;

extracting selected terms from the portion of the data set, wherein the selected terms were identified as important based on calculated information retrieval measurements of the portion of the data set;

training topic models for the subset of the hierarchy of topics and the one or more subtopics using the selected terms from the portion of the data set and a probabilistic learning technique, wherein for each topic model the training comprises:

determining a prior knowledge estimate based on estimated prior knowledge of the portion of the data set belonging to the topic model;

determining a plurality of term contribution estimates by processing each term of the selected terms to estimate a measure of evidence that the term contributes to the portion of the data set belonging to the topic model; and combining the prior knowledge estimate and the plurality of term contribution estimates to determine a probability that the portion of the data set belongs to the topic model;

evaluating an accuracy and evaluating a complexity of each topic model of the topic models in response to a determination that a topic model has been trained for at least one subtopic;

determining that the subset of the hierarchy of topics is an appropriate topic for textual data generated via a social networking service by determining that the subset of the hierarchy of topics balances the accuracy and the complexity of the topic models, wherein the subset of the hierarchy of topics is at a median hierarchy level relative to the hierarchy of topics; and detecting one or more appropriate subtopics of the appropriate topic that are most appropriate for the textual data generated via the social networking service by examining the accuracy of each topic model associated with the one or more subtopics of the appropriate topic, wherein the detecting one or more appropriate subtopics of the appropriate topic comprises applying a locality-sensitive hashing (LSH) technique to the textual data generated via the social networking service and the portion of the data set.

10. The system of claim 9, wherein evaluating the accuracy of each topic model of the topic models comprises:

identifying a label from the textual data generated via the social networking service according to the portion of the data set;

assigning the label to the appropriate topic;

performing a topic detection technique; and comparing a result of the topic detection technique to human references in order to determine the accuracy of each topic model of the topic models.

11. The system of claim 9, wherein the probabilistic learning technique is employed by using a model $P(c|d) \propto P(c) \cdot \pi_{1 \leq k \leq n} P(t_k|c)$, wherein $P(t_k|c)$ is a conditional probability of a term $t_k$ occurring in a subset of the portion of the data set having class c.

12. The system of claim 9, wherein the data set comprises a category link dump and an articles dump from an Internet encyclopedia.

13. The system of claim 9, wherein the textual data generated via a social networking service is gathered over a period in a range of seven (7) to fifteen (15) days.

14. The system of claim 9, wherein the textual data generated via a social networking service is gathered from TWITTER® social networking service.

15. The system of claim 12, wherein the category link dump comprises human-specified concept relations and the articles dump comprises article content and redirect links.

16. The system of claim 9, wherein detecting the one or more appropriate subtopics that are most appropriate for textual data generated via the social networking service comprises: receiving the textual data from a social networking service; concatenating the textual data into a single document; and detecting the one or more appropriate subtopics in the single document.

* * * * *